(12) United States Patent
Zheng

(10) Patent No.: US 12,488,517 B2
(45) Date of Patent: Dec. 2, 2025

(54) COLOR CARD GENERATING METHOD, IMAGE PROCESSING METHOD, AND APPARATUSES, AND READABLE STORAGE MEDIUM

(71) Applicant: Beijing Zitiao Network Technology Co., Ltd., Beijing (CN)

(72) Inventor: Wei Zheng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 92 days.

(21) Appl. No.: 18/570,549

(22) PCT Filed: Aug. 24, 2022

(86) PCT No.: PCT/CN2022/114452
§ 371 (c)(1),
(2) Date: Dec. 14, 2023

(87) PCT Pub. No.: WO2023/035943
PCT Pub. Date: Mar. 16, 2023

(65) Prior Publication Data
US 2024/0265589 A1    Aug. 8, 2024

(30) Foreign Application Priority Data
Sep. 10, 2021    (CN) .......................... 202111064201.4

(51) Int. Cl.
*G09G 5/02*    (2006.01)
*G06T 11/00*    (2006.01)
(Continued)

(52) U.S. Cl.
CPC ................................. *G06T 11/001* (2013.01)

(58) Field of Classification Search
CPC ........ G06T 11/001; G06T 2207/10024; G09G 2320/0233; G09G 2320/0271;
(Continued)

(56) References Cited

U.S. PATENT DOCUMENTS

2002/0159083 A1* 10/2002 Arai ....................... H04N 1/603
358/1.9
2004/0257377 A1* 12/2004 Ruark ................... G06T 11/001
345/589

(Continued)

FOREIGN PATENT DOCUMENTS

CN    107154059 A    9/2017
CN    107590780 A    1/2018
(Continued)

*Primary Examiner* — Wesner Sajous
(74) *Attorney, Agent, or Firm* — Astute IP Law Group

(57) ABSTRACT

The present disclosure relates to a color card generation method, an image processing method, apparatuses, and a readable storage medium. The method includes: transferring first standard colors in a first color display standard into colors in a second color display standard, to obtain a first color set; performing channel separation on the second standard colors in the first color set, to acquire color components of the second standard colors respectively in a target color channel; adjusting the color components of the second standard colors respectively in the target color channel, to obtain a second color set; and generating a target color card in the second color display standard, according to the second color set, wherein, the target color card is used for implementing a target effect.

20 Claims, 5 Drawing Sheets

(51) Int. Cl.
  *G09G 5/06* (2006.01)
  *G09G 5/30* (2006.01)
  *H04N 1/60* (2006.01)
  *H04N 5/57* (2006.01)
  *H04N 9/64* (2023.01)
  *H04N 9/73* (2023.01)
  *H04N 9/74* (2006.01)
  *H04N 9/77* (2006.01)
  *H04N 9/79* (2006.01)

(58) Field of Classification Search
  CPC ... G09G 2320/0276; G09G 2320/0285; G09G 5/02; G09G 5/04; G09G 5/06; G09G 5/028; G09G 5/10; G09G 5/30; G09G 3/003; G09G 3/2003; G09G 2320/02; G09G 2320/04; G09G 2320/0242; G09G 2320/06; G09G 2320/0626; G09G 2320/066; G09G 2320/0666; G09G 2320/0673; G09G 2320/0693; G09G 2340/06; H04N 1/60; H04N 1/6002; H04N 1/6008; H04N 1/6016; H04N 1/6019; H04N 1/6025; H04N 1/6027; H04N 1/6033; H04N 1/6041; H04N 1/6055; H04N 1/6058; H04N 1/6077; H04N 1/64–646; H04N 1/57–58; H04N 9/43; H04N 9/64–79
  See application file for complete search history.

(56) References Cited

U.S. PATENT DOCUMENTS

| | | | | |
|---|---|---|---|---|
| 2007/0216772 | A1* | 9/2007 | Xu | H04N 9/73 |
| | | | | 348/E9.051 |
| 2009/0122132 | A1* | 5/2009 | Thielman | H04N 17/02 |
| | | | | 348/E7.083 |
| 2018/0315396 | A1* | 11/2018 | Awad | G06T 5/92 |
| 2022/0366694 | A1* | 11/2022 | Sahloul | G06V 10/752 |

FOREIGN PATENT DOCUMENTS

| | | | | |
|---|---|---|---|---|
| CN | 110070586 A | | 7/2019 | |
| CN | 110070586 B | * | 4/2020 | .......... G06T 11/001 |
| JP | 2018198381 A | | 12/2018 | |

* cited by examiner

COLOR CARD GENERATING METHOD, IMAGE PROCESSING METHOD, AND APPARATUSES, AND READABLE STORAGE MEDIUM

CROSS REFERENCE TO RELATED APPLICATION

This application is a national phase of International Patent Application No. PCT/CN2022/114452, filed on Aug. 24, 2022, which claims the priority of Chinese Patent Application No. 202111064201.4, filed on Sep. 10, 2021. All the aforementioned patent applications are hereby incorporated by reference in their entireties.

TECHNICAL FIELD

The present disclosure relates to a field of image processing technology, and more particularly, to a color card generation method, an image processing method, apparatuses, and a readable storage medium.

BACKGROUND

With continuous development of display technology, color display standards that meet higher display needs of users have been proposed. Intelligent terminals also support capturing photos and videos corresponding to high color display standards. Since photos and videos corresponding to high color display standards can present more details in lighting, richer colors, and can maximize presentation of real scenes, they are highly favored by users. Intelligent terminals support use of effects such as filters, stickers, etc. during a process of taking photos or videos, so as to achieve more diverse shooting effects; intelligent terminals further support editing already captured image elements, for example, adding effects such as filters, stickers, etc.

At present, adding effects to image elements is implemented by color cards, while the existing color cards used for effects only correspond to low color display standards and cannot be applied to image elements of high color display standards.

SUMMARY

In solve the above technical problems or at least a part of the technical problems, the present disclosure provides a color card generation method, an image processing method, apparatuses and a readable storage medium.

In a first aspect, the present disclosure provides a color card generation method which includes:
transferring first standard colors in a first color display standard into colors in a second color display standard, to obtain a first color set; wherein, the first color set includes second standard colors in the second color display standard; and a color range of the first color display standard is smaller than a color range of the second color display standard,
performing channel separation on the second standard colors in the first color set, to acquire color components of the second standard colors respectively in a target color channel;
adjusting the color components of the second standard colors respectively in the target color channel, to obtain a second color set; and
generating a target color card in the second color display standard, according to the second color set, wherein, the target color card is used for implementing a target effect.

In some implementations, the transferring first standard colors in a first color display standard into colors in a second color display standard, to obtain a first color set, includes:
acquiring optical signal data corresponding to the first standard colors; and
transferring the optical signal data corresponding to the first standard colors, according to an opto-electrical transfer function of the second color display standard, to obtain the first color set.

In some implementations, before the acquiring optical signal data corresponding to the first standard values, the method further includes:
acquiring electrical signal data corresponding to the first standard colors; and
transferring the electrical signal data corresponding to the first standard colors, according to an electro-optical transfer function of the first color display standard, to obtain the optical signal data corresponding to the first standard colors.

In some implementations, the adjusting the color components of the second standard colors respectively in the target color channel, to obtain a second color set, includes:
acquiring color card configuration information, wherein the color card configuration information is used to indicate an adjustment strategy corresponding to the color components corresponding to the target color channel; and
adjusting the color component values of the second standard colors in the target color channel, according to the color card configuration information, to obtain the second color set.

In some implementations, the color card configuration information includes: color components of the colors in the second color set in the target color channel, and/or, information of a function for adjusting the color components corresponding to the second standard colors in the target color channel.

In some implementations, the generating a target color card in the second color display standard, according to the second color set, includes:
acquiring coordinate positions of the second standard colors in a standard color card to which they belong;
acquiring coordinate positions of the colors in the second color set, according to a corresponding relationship between the second standard colors and the colors in the second color set, as well as the coordinate positions of the second standard colors in the standard color card to which they belong; and
obtaining the target color card, according to the colors in the second color set and the coordinate positions of the colors in the second color set.

In some implementations, the target color channel belongs to a target color space; and the target color space includes at least one of: an RGB color space, a YUV color space, and an HSV color space.

In some implementations, the first color display standard includes a standard dynamic range SDR color display standard; and the second color display standard includes a high dynamic range HDR color display standard.

In a second aspect, the present disclosure provides an image processing method, which includes:

acquiring an image element to be processed and a target color card; wherein, the target color card is generated through the color card generation method according to any of the first aspect;

determining a target color corresponding to a pixel point, for each pixel point in the image element to be processed, according to an original color of the pixel point and the target color card; wherein the original color corresponding to the pixel point and the target color both being colors in the second color display standard; and acquiring a target image element, according to a target color corresponding to each pixel point.

In some implementations, the determining a target color of the pixel point in the second color display standard, according to the original color of the pixel point and the target color card, includes:

acquiring a coordinate position of the target color in the target color card, according to the original color and a coordinate position of the original color in a standard color card to which it belongs; and querying the target color card, based on the coordinate position of the target color in the target color card, to obtain the target color.

In some implementations, the method further includes:

transferring electrical signal data of the target colors corresponding to the pixel points in the target image element into optical signal data, according to an electro-optical transfer function corresponding to the second color display standard, to display the target image element.

In a third aspect, a color card generation apparatus is provided, which includes:

a color transferring module, configured to transfer first standard colors in a first color display standard into colors in a second color display standard, to obtain a first color set; wherein, the first color set includes second standard colors in the second color display standard; and a color range of the first color display standard is smaller than a color range of the second color display standard;

a channel separating module, configured to perform channel separation on the second standard colors in the first color set, to acquire color components of the second standard colors respectively in a target color channel;

an adjusting module, configured to adjust the color components of the second standard colors respectively in the target color channel, to obtain a second color set; and a color card generation module, configured to generate a target color card in the second color display standard, according to the second color set, wherein, the target color card is used for implementing a target effect.

In a fourth aspect, an image processing apparatus is provided, which includes:

an acquiring module, configured to acquire an image element to be processed and a target color card; wherein, the target color card is generated through the color card generation method according to any of the first aspect;

a color mapping module, configured to determine a target color corresponding to a pixel point, for each pixel point in the image element to be processed, according to an original color of the pixel point and the target color card; wherein, the original color of the pixel point and the target color both are colors in the second color display standard; and an image generation module, configured to acquire a target image element, according to a target color corresponding to each pixel point.

In a fifth aspect, an electronic device is provided, which includes:

the memory is configured to store computer program instructions; and the processor is configured to execute the computer program instructions, to implement the color card generation method according to any of the first aspect, or implement the image processing method according to any of the second aspect.

In a sixth aspect, a readable storage medium is provided, which includes computer programs, the computer program, when executed by at least one processor of an electronic device, implements the color card generation method according to any of the first aspect, or implements the image processing method according to any of the second aspect.

In a seventh aspect, a program product is provided, which includes computer program instructions, the computer program instructions are stored in a readable storage medium, and at least one processor of an electronic device reads the computer program instructions from the readable storage medium; the at least one processor executes the computer program instructions to implement the color card generation method according to any of the first aspect, or the image processing method according to any of the second aspect.

BRIEF DESCRIPTION OF THE DRAWINGS

The accompanying drawings herein are incorporated into the specification and form a part of this specification, which illustrate the embodiments according to the present disclosure, and are used together with the specification to explain the principles of the present disclosure.

In order to provide a clearer explanation of the disclosed embodiments or technical solutions in the related art, a brief introduction will be given to the accompanying drawings required in the embodiments or description of the related art. It is obvious that for ordinary technical personnel in the art, other accompanying drawings can be obtained based on these drawings without any creative effort.

DETAILED DESCRIPTION

Figure 1:
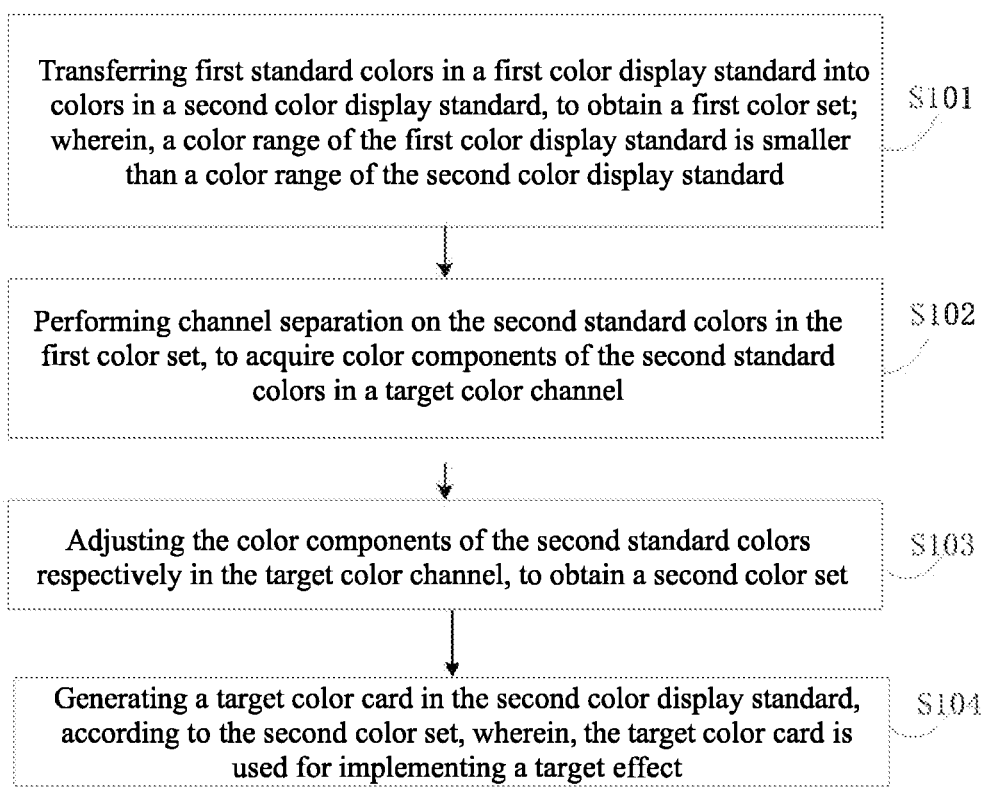
FIG. 1 is a flow chart of a color card generation method provided by embodiments of the present disclosure.

In order to better understand the above objectives, features, and advantages of the present disclosure, the following will further describe the disclosed schemes. It should be noted that in the absence of conflict, the embodiments disclosed herein and the features in the embodiments can be combined with each other.

Many specific details have been elaborated in the following description to facilitate a full understanding of the present disclosure, but the present disclosure can also be implemented in other ways different from those described herein. Obviously, the embodiments described in the specification are only a portion of the embodiments disclosed in this disclosure, rather than all of them.

At present, high color display standards usually allow for higher maximum luminance and wider color gamut standards, which may provide richer colors and maximize presentation of real scenes, and thus, are highly favored by users.

However, in the related art, color cards for implementing effects usually adopt low color display standards. If a color card adopting a low color display standard for implement an effect is applied to an image element correspond to a high color display standard, failure to align color gamuts of the two different color display standards may result in abnormal visual effects of the image element after adding the effect.

For example, a High dynamic range (HDR) color display standard has a color space meet bt2020nc, and has three primary colors of three primary colors bt.2020, while a Standard dynamic range (SDR) color display standard has a color space meet bt709nc; and the HDR color display standard may express richer colors and better visual effects. However, if a color card adopting the SDR color display standard to implement an effect is applied to an image element of the HDR color display standard, failure to align color gamuts between the SDR and the HDR may result in a darker overall color of the image element added with the effect, thus, visual effects of the image element are affected and user experience are reduced.

That is, a color card adopting a low color display standard to implement an effect cannot adapt to an image element of a high color display standard.

Based on this, the present disclosure provides a color card generation method, an image processing method, apparatuses, an electronic device, a readable storage medium and a program product; wherein, in the color card generation method provided by the present disclosure, the first standard colors of the first color display standard are transferred into the colors of the second color display standard, to obtain the first color set, wherein, the color range of the first color display standard is smaller than the color range of the second color display standard; thereafter, channel separation is performed on the second standard color values in the first color set, and the color components of the second standard colors on the target color channel are adjusted, to obtain the second color set; and the target color card for implementing the target effect in the second color display standard is obtained based on the second color set. The present disclosure solves the problem of how to generate the target color card for implementing the target effect under the second color display standard. In addition, based on the target color card of the second color display standard, the effect is added to the image element of the second color display standard; since both the target color card and the image element belong to the second color display standard and match each other, the image element added with the effect has a richer visual effect, which is favorable for improving user experience.

The color card generation method provided by the present disclosure may be executed by the color card generation apparatus provided by the present disclosure. Wherein, the color card generation apparatus may be a mobile phone, a tablet personal computer, a laptop, a palmtop computer, a vehicle-mounted terminal, a wearable device, an Ultra-Mobile Personal Computer (UMPC), a netbook or a Personal Digital Assistant (PDA), a Personal Computer (PC), etc. which will not be specifically limited in the present disclosure.

Hereinafter, the color card generation method provided by the present disclosure will be introduced in detail through several specific embodiments. It should be noted that the color card generation method provided by the present disclosure is described by taking a scene of generating a color card in the HDR color display standard to implement an effect as an example. It should be understood that the color card generation method provided by the present disclosure is not only applicable to the scene of generating a color card in the HDR color display standard to implement the effect, but also applicable to a scene of generating a color card in other higher or lower color display standard to implement an effect. It will be illustrated by taking an electronic device as example in embodiments below.

FIG. 1 is a flow chart of a color card generation method provided by embodiments of the present disclosure. Referring to FIG. 1, the color card generation method provided by the embodiments may include:

S101: transferring first standard colors in a first color display standard into colors in a second color display standard, to obtain a first color set; wherein, a color range of the first color display standard is smaller than a color range of the second color display standard.

The first color display standard and the second color display standard will not be limited in the present disclosure. The first color display standard and the second color display standard may be any two color display standards. Wherein, the color range of the first color display standard is smaller than the color range of the second color display standard. For example, the first color display standard includes a SDR color display standard; the second color display standard includes an HDR color display standard; and a color range of the SDR color display standard is smaller than a color range of the HDR color display standard.

In an implementation: optical signal data of the first standard colors in the first color display standard is transferred based on an opto-electrical transfer function corresponding to the second color display standard, so as to transfer the first standard colors into the colors in the second color display standard, and to obtain the first color set.

In another implementation: a standard color card image of the first color display standard is transferred based on an electro-optical transfer function corresponding to the first color display standard, to obtain optical signal data corresponding to the first standard colors, and then the optical signal data of the first standard colors in the first color display standard is transferred based on the opto-electrical transfer function corresponding to the second color display standard, so as to transfer the first standard colors into the colors in the second color display standard, and to obtain the first color set.

It should be noted that when encoding modes corresponding to the first color display standard are different (or may also be understood as that formats are different), the electro-optical transfer functions are different accordingly; similarly, when encoding modes corresponding to the second color display standard are different (or may also be understood as that format are different), the opto-electrical transfer functions are also different accordingly.

S102: performing channel separation on the second standard colors in the first color set, to acquire color components of the second standard colors in a target color channel.

In an implementation: a target color space is firstly determined, according to an effect to be implemented by the target color card; channel separation on the second standard colors is performed after determining the target color space, to acquire the color components of the second standard colors respectively in a plurality of color channels in the target color space, in which, the color components of the second standard colors in the plurality of color channels include color components of the target color channel.

Wherein, the target color space may include but is not limited to at least one of color spaces below: an RGB color space, a YUV color space, and an HSV color space.

For example, assuming that an effect to be implemented by the target color card is becoming brighter in luminance, then it may be implemented by adjusting color components of the second standard colors in a Y channel, and the target color space may include the YUV color space. Wherein, "Y" represents luminance or luma, and "U" and "V" both represent chrominance or chroma.

For another example, assuming that an effect to be implemented by the target color card is to be ruddier in color, then it may be implemented by adjusting color components of the second standard colors in an R channel, and the target color space may include the RGB color space. Wherein, "R" represents red, "G" represents green, and "B" represents blue.

For another example, assuming that an effect to be implemented by the target color card is to be more vivid in color, it may be implemented by adjusting color components of the second standard colors in an S channel, and the target color space may include the HSV color space. Wherein, "H" represents hue, "S" represents saturation, and "V" represents value.

S103: adjusting the color components of the second standard colors respectively in the target color channel, to obtain a second color set.

When the electronic device adjusts the color components of the second standard colors respectively in the target color channel, the mode may include, but not limited to, linear adjustment or nonlinear adjustment.

In an implementation, the mode of adjusting the color components of the second standard colors in the target color channel by the linear adjustment may be implemented through a preset linear function. Exemplarily, the color component values of the second standard colors on the target color channel may be taken as independent variables of the linear function, and respectively calculated according to a preset linear function formula, to obtain the adjusted color components.

When adopting the linear function to implement linear adjustment, specific implementations of the linear function are not limited in the embodiments of the present disclosure.

In another implementation, the mode of adjusting the color components of the second standard color values in the target color channel by the nonlinear adjustment may be implemented according to a preset nonlinear function, or may also be implemented according to a preset corresponding relationship.

Wherein, the implementation of adjusting the color components of the second standard colors in the target color channel by adopting the nonlinear function is similar to the implementation of adjusting the color components of the second standard colors in the target color channel by adopting the linear function; the color components of the second standard colors in the target color channel are taken as independent variables and calculated according to the nonlinear function formula, to obtain the adjusted color components.

When adjusting according to the preset corresponding relationship, the preset corresponding relationship may include: a corresponding relationship between the color components of the target color channel before and after the adjustment.

Exemplarily, it is illustrated by taking the target channel in the RGB space as an R channel, and the preset corresponding relationship is as shown in Table 1 below:

TABLE 1

| Second standard colors (R channel) | Target colors (R channel) |
|---|---|
| 0 | 0.2 |
| 1 | 0.8 |
| 2 | 1.6 |
| 3 | 2.4 |

Optionally, the preset corresponding relationship may further include a corresponding relationship between color components of one or more color channels other than the target color channel in the target color space before and after adjustment.

Exemplarily, on the basis of the example shown in Table 1, in addition to the corresponding relationship between the color component values of the R channel before and after adjustment, the preset corresponding relationship may further include corresponding relationships between color components of the G channel and the B channel before and after adjustment, for example, as shown in Table 2 below:

TABLE 2

| Second standard colors | | | Target colors | | |
|---|---|---|---|---|---|
| R channel | G channel | B channel | R channel | G channel | B channel |
| 1 | 0 | 0 | 0.8 | 0 | 0 |
| 0 | 1 | 0 | 0 | 0.8 | 0 |
| 0 | 0 | 1 | 0 | 0 | 0.8 |

The above-described table 1 and table 2 are only examples; in practical applications, the preset corresponding relationship may include other corresponding relationships between the second standard colors and the target colors, and values of color components of the color channels in the preset corresponding relationship may also be set flexibly.

With the several foregoing adjustment manners, the electronic device may determine the target color channel to be adjusted and the adjustment manner to be used as follows.

In one implementation, the electronic device may determine an adjustment strategy corresponding to the color components corresponding to the target color channel, by acquiring color card configuration information. Exemplarily, the color card configuration information is used to indicate the color component adjustment strategy corresponding to the target color channel.

In some implementations, the color card configuration information may further include: information for indicating the target color channel; and the electronic device determine the target color channel to be adjusted and the adjustment strategy for the color components of the target color channel by parsing the color card configuration information, and then adjust the color component values of the second standard color value on the target color channel, based on the adjustment manner indicated by the adjustment strategy, to obtain the second color set.

In addition, an implementation for the electronic device to acquire the color card configuration information are not limited in the present disclosure; for example, the electronic device may acquire the color card configuration information from a connected storage device, or may also acquire the color card configuration information based on user input.

In another implementation, if the color components of the second standard colors on the target color channel is adjusted by the user, then the electronic device may display a user interface for adjusting the color component values of the target color channel according to an operation instruction input by the user; and the user may adjust the color components of the second standard colors in the target color channel by operating options or controls displayed in the user interface, for example, an adjustment option corresponding to linear adjustment, an input box corresponding to nonlinear adjustment, etc.

In practical application, implementations of adjusting the color components of the second standard colors in the target color channel are not limited to the above-described examples, and are not limited in the present disclosure.

S104: generating a target color card in the second color display standard, according to the second color set, wherein, the target color card is used for implementing the target effect.

In one implementation, the second standard colors in the second color display standard may be mapped to a three-dimensional coordinate system, to obtain a first color cube. Corresponding second standard colors are replaced with the colors in the second color set, based on the corresponding relationship between the second standard colors and the colors in the second color set, to generate a second color cube; samples are taken along any coordinate axis of the three-dimensional coordinate system in a preset mode, based on the second color cube, to obtain sub-color cards; and then the sub-color cards are arranged in a manner from left to right and from top to bottom, to obtain a target color card.

In another implementation, coordinate positions of the colors in the second color set may be determined, through the coordinate positions of the second standard colors in the standard color card to which they belong, and according to the corresponding relationship between the second standard colors and the colors in the second color set; and the target color card is obtained, according to the colors in the second color set and the coordinate positions of the colors in the second color set. Wherein, the standard color card to which the second standard colors belong may also be obtained by sampling the first color cube and arranging the sampled standard sub-color cards in a manner from left to right and from top to bottom, as described above.

Exemplarily, the target color card may be stored in a form of resource package. Wherein, the resource package corresponding to the target color card may include color information of the sub-color cards, an arrangement order of the sub-color cards, and so on.

Hereinafter, in conjunction with FIG. 2, how to obtain the sub-color cards by sampling from the second color cube will be illustrated by taking that the colors in the second color set are in the RGB space as an example.

Figure 2:
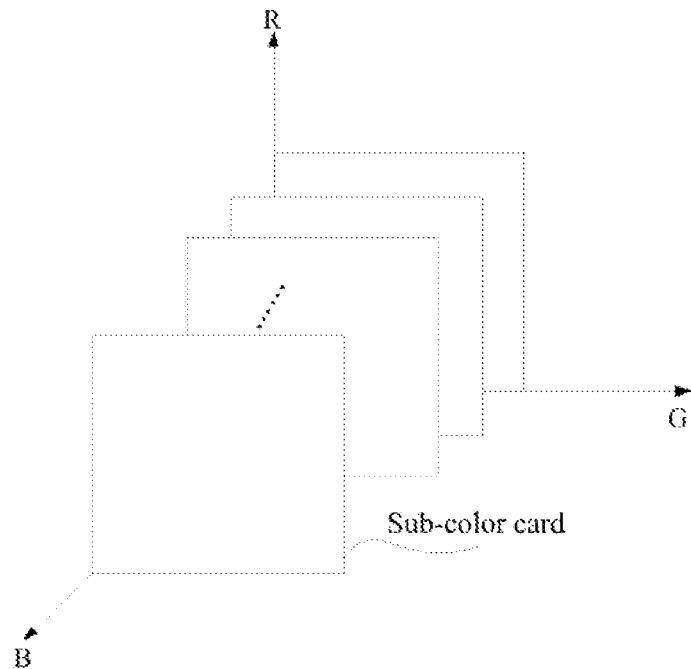
FIG. 2 is a flow chart of a color card generation method provided by another embodiment of the present disclosure.

For example, referring to FIG. 2, firstly, color components of the second standard colors in the R channel are mapped to an X axis in a Cartesian three-dimensional coordinate system, color components of the second standard colors in the G channel are mapped to a Y axis in the Cartesian three-dimensional coordinate system, and color component values of the second standard colors in the B channel are mapped to a Z axis in the Cartesian three-dimensional coordinate system; next, the second standard colors are replaced with the colors in the second color set, based on the corresponding relationship between the colors in the second color set and the second standard colors; all color component values on the X axis and the Y axis are traversed, then sampling is performed along the Z-axis direction at a preset sampling rate (i.e. a sampling interval), to obtain a plurality of sub-color cards 101; and then the plurality of sub-color cards 101 are arranged in a sampling order, from left to right and from top to bottom, into a plurality of rows and a plurality of columns, to generate the target color card. Correspondingly, the resource package of the target color card may include an RGB color value of each sub-color card and position information (e.g., coordinate values) of each sub-color card in the target color card.

In another implementation, the color components of the colors in the second color set on the color channels in the target color space are mapped to a pre-established three-dimensional coordinate system; RGB values of corresponding sampling positions are obtained in the three-dimensional coordinate system, based on information indicating the sampling positions; and then the resource package of the target color card is generated for the RGB color values according to the corresponding sampling positions. Wherein, the information that may indicate the sampling positions as referred to here may include but is not limited to one or more pieces of information such as sampling order and coordinates of the sampling position, etc.

Exemplarily, with further reference to the example shown in FIG. 2, the colors in the second color set are mapped to the three-dimensional coordinate system; and sampling may be performed along the Z axis, to obtain the sub-color cards. In practical applications, the sampling is not limited to being performed along the Z axis, for example, the sampling may also be performed along the X axis and the Y axis.

In the method provided by the embodiments, the first standard colors of the first color display standard are transferred into the colors of the second color display standard, to obtain the first color set, wherein, the color range of the first color display standard is smaller than the color range of the second color display standard; thereafter, channel separation is performed on the second standard color values in the first color set, and the color components of the second standard colors on the target color channel are adjusted, to obtain the second color set; and the target color card for implementing the target effect in the second color display standard is obtained based on the second color set. The present disclosure solves the problem of how to generate the target color card for implementing the target effect under the second color display standard. In addition, based on the target color card of the second color display standard, the effect is added to the image element of the second color display standard; since both the target color card and the image element belong to the second color display standard and match each other, the image element added with the effect has a richer visual effect, which is favorable for improving user experience.

Next, the entire process of the target color card corresponding to the target effect will be illustrated exemplarily, by taking generation of the target color card for implementing the target effect in the HDR color display standard based on the first standard colors in the SDR color display standard as an example.

For example, referring to FIG. 3, the color card generation method may include a process below:
(1) Performing channel separation on the first standard colors in the SDR color display standard and adjusting the color components of the target color channel, to obtain a target color card adopting the SDR color display standard (i.e. the SDR target color card in FIG. 3) to implement the target effect.
(2) Transferring the first standard colors in the SDR color display standard, to obtain corresponding second standard colors in the HDR color display standard, that is, the first color set; and acquiring the target color card adopting the HDR color display standard (i.e. the HDR target color card in FIG. 3) to implement the target effect, by performing channel separation on the second standard colors in the HDR color display standard and adjusting the color components of the target color channel, and based on the adjusted colors.

Due to a difference between a color value range of the SDR color display standard and a color value range of the HDR color display standard, the implementation of performing channel separation on the first standard colors in the SDR color display standard and adjusting the color components of the target color channel, and the implementation of performing channel separation on the second standard colors in the HDR color display standard and adjusting the color components of the target color channel may be the same or different, which will not be limited in the present disclosure.

Optionally, in order to check an effect of the HDR target color card implementing the effect, the SDR target color card and the HDR target color card may be respectively added to the image element, that is, the effect are added to the image element respectively based on the SDR target color card and the HDR target color card, to obtain image elements added with the target effect respectively according to the SDR target color card and the HDR target color card.

Specifically, the original image element is respectively parsed into an image adopting the SDR color display standard format and an image adopting the HDR color display standard format. If the original image element is a single image, then the single image is respectively parsed into the SDR color display standard format and the HDR color display standard format; if the original image element is a video, then each video frame of the video may be respectively parsed into a video frame in the SDR color display standard format and a video frame in the SDR color display standard format.

Figure 3:
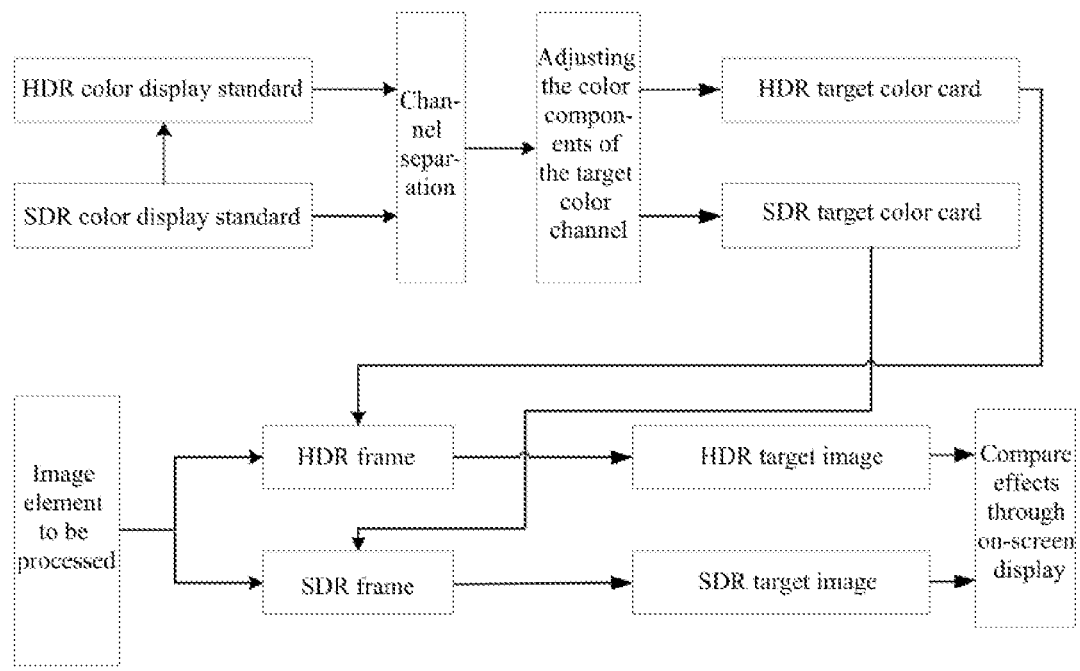
FIG. 3 is a flow chart of a color card generation method provided by another embodiment of the present disclosure.

The effect is performed on the image element in the SDR color display standard format according to the SDR target color card, to obtain an SDR target image added with the target effect (i.e. the SDR target image in FIG. 3).

The effect is performed on the image element in the HDR color display standard format according to the HDR target color card, to obtain the HDR target image added with the target effect (i.e. the HDR target image in FIG. 3).

Next, visual effects of the SDR target image and the HDR target image are compared, to determine whether the HDR target color card meets production requirements. In one implementation, whether the HDR target color card meets production requirements may be determined by a user through on-screen display; in another implementation, whether the HDR target color card meets production requirements may be determined by collecting image information from the SDR target image and image information from the HDR target image, and automatically comparing the collected image information of the SDR target image with the collected image information HDR target image.

Exemplarily, the present disclosure further provides an image processing method.

Figure 4:
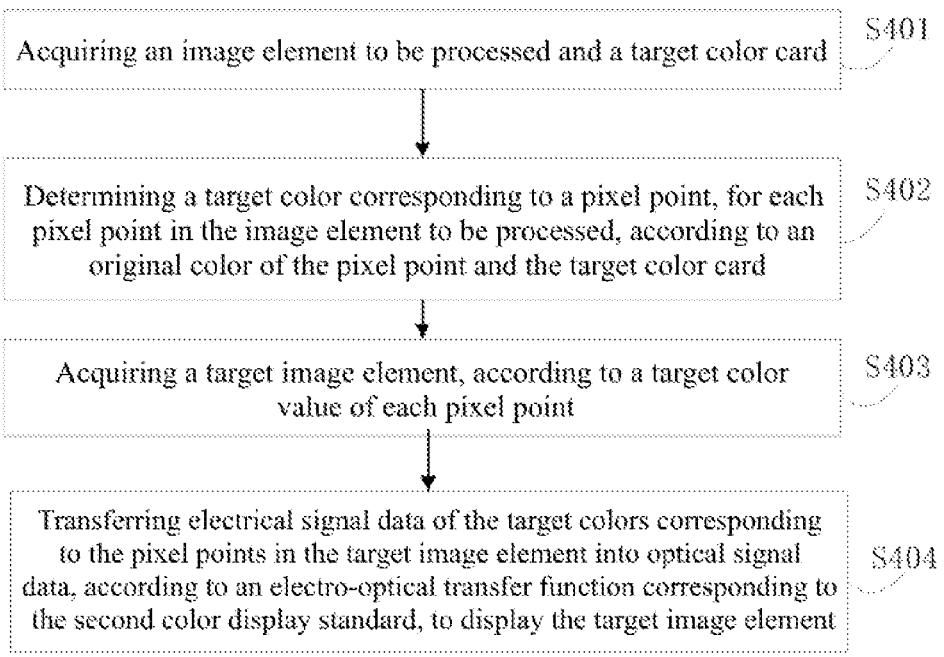
FIG. 4 is a flow chart of the image processing method provided by embodiments of the present disclosure.

FIG. 4 is a flow chart of an image processing method provided by embodiments of the present disclosure. In the embodiments, it is illustrated by taking an electronic device as an example. As shown in FIG. 4, the image processing method provided by the embodiment may include:

S401: acquiring an image element to be processed and a target color card.

Wherein, the image element to be processed may include one or more types such as photo, video, and picture.

If the image element to be processed includes a photo and/or a picture, the photo and/or the picture may be obtained by the electronic device through real-time shooting or downloading, or may be pre-stored in a storage module of the electronic device; modes of acquiring photos and/or pictures by the electronic device, as well as parameters such as the number of photos and/or pictures, storage format, size, resolution, etc. will not be limited in the present disclosure.

If the image element to be processed includes a video, the video may be obtained by the electronic device through real-time shooting or downloading, or may also be pre-stored in the storage module of the electronic device. Modes of acquiring videos, as well as parameters such as the number of videos, storage format, video duration, resolution, etc. will not be limited in the present disclosure.

The target color card as mentioned in step S401 may be generated by the color card generation method according to any of the embodiments shown in FIG. 1 to FIG. 3. The electronic device may acquire a resource package corresponding to the target color card, wherein, the detailed description in the foregoing embodiments may be referred to for the resource package corresponding to the target color card; and for simplicity, no details will be repeated here.

It should be noted that in the embodiments, the target color card and the image element to be processed belong to a same color display standard, that is, the second color display standard according to the foregoing embodiments. For example, both the target color card and the image element to be processed belong to the HDR color display standard.

In an implementation, assuming that the resource package corresponding to the target color card is stored on a server device, the electronic device may send a resource package acquisition request to the server device, and acquire the resource package corresponding to the target color card based on feedback information from the server device. Wherein, the resource package acquisition request may include identification information of the resource package corresponding to the target color card; the identification information is, for example, name of the target color card, numerical number of the target color card, and so on. Feedback information sent by the server device to the electronic device includes: the resource package of the target color card.

In another implementation, the electronic device may further pre-store the resource package of the target color card; and the electronic device may acquire the resource package of the target color card from its own storage.

S402: determining a target color corresponding to a pixel point, for each pixel point in the image element to be processed, according to an original color of the pixel point and the target color card.

Wherein, the original color corresponding to the pixel point of the image element to be processed and the target color both are colors in the second color display standard, that is, the target image element obtained by adding the target effect based on the target color card is also an image in the second color display standard.

In an implementation, a three-dimensional coordinate system for mapping the second standard color values in the second color display standard is queried, for each pixel point in the image element to be processed, based on the original color corresponding to the pixel point, to determine a position of the original color corresponding to the pixel point in the three-dimensional coordinate system; a coordinate position of the target color in the target color card is determined, based on a corresponding relationship between the original color and the target color, and the target color card is queried, to obtain a color value of the corresponding position, that is, the target color, in the target color card.

Wherein, the original color corresponding to the pixel point may be understood as the second standard color; the querying the target color card to obtain the target color value may be understood as obtaining the target color corresponding to the second standard color through the target color card.

In another implementation, the coordinate position of the target color corresponding to the original color in the target color card may also be determined, according to the original color and the coordinate position of the original color in the standard color card to which it belongs; then, the color of the corresponding position, that is, the target color, is acquired, according to the determined coordinate position of the target color in the target color card.

In some cases, the standard color card to which the second standard color belongs is obtained through sampling; as such, some of the second standard colors in the second color display standard are not included in the standard color card, and a corresponding target color cannot be directly found in the target color card. Therefore, one or more colors adjacent to the original color (referred to as adjacent colors) may be determined, based on the original color; the target color card is queried, based on the one or more adjacent colors, to obtain target colors respectively corresponding to the adjacent colors; and then the target color corresponding to the original color is obtained through fitting, by using a interpolation method for the target colors respectively corresponding to the adjacent colors, or by other means.

S403: acquiring the target image element, according to a target color value of each pixel point.

Specifically, an original color value of a pixel point is replaced by the target color value of each pixel point, to obtain the target image element.

In the embodiment, the target image element is generated, by obtaining the image element to be processed and the target color card that both belong to the second color display standard, and using the target color card to add an effect to the image element to be processed. Since the color space (which may also be understood as color gamut space) of the target color card and the color space (which may also be understood as color gamut space) of the image element to be processed are aligned, the target color card may adapt to the image element to be processed, which ensures that the obtained target image element has better visual effects and avoids problems such as abnormal display of the image element color after transferring by the effect.

Optionally, on the basis of the embodiment shown in FIG. 4, the image processing method further includes:

S404: transferring electrical signal data of the target colors corresponding to the pixel points in the target image element into optical signal data, according to the electro-optical transfer function corresponding to the second color display standard, to display the target image element.

In the embodiment, hardware resources of the electronic device support display of the second color display standard, for example, display of the HDR color display standard; then the electronic device can transfer the electrical signal data of the target colors respectively corresponding to these pixel points into optical signal data, according to the target color values corresponding to the pixel points of the target image element as well as the second color display standard format, by using the electro-optical transfer function corresponding to the second color display standard format, to display the target image element.

By the image processing method according to the embodiments of the present disclosure, the displayed target image element may have a richer visual effect, which is favorable for improving user experience and enhancing enthusiasm of the user for using the effects.

Exemplarily, the present disclosure further provides a color card generation apparatus.

Figure 5:
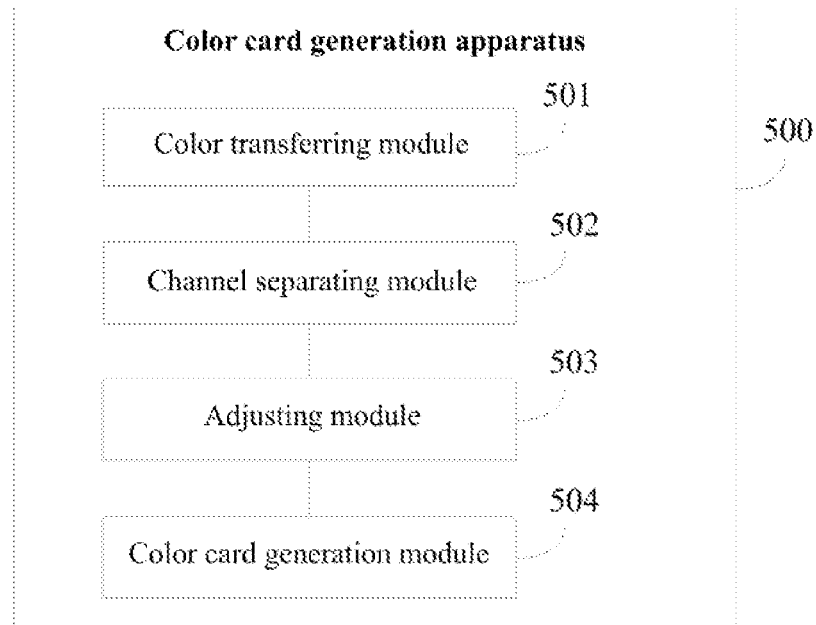
FIG. 5 is a structural schematic diagram of a color card generation apparatus provided by embodiments of the present disclosure.

FIG. 5 is a structural schematic diagram of a color card generation apparatus provided by embodiments of the present disclosure. As shown in FIG. 5, the color card generation apparatus 500 provided by the embodiments includes:

A color transferring module 501, configured to transfer first standard colors in a first color display standard into colors in a second color display standard, to obtain a first color set; wherein, the first color set includes second standard colors in the second color display standard; and a color range of the first color display standard is smaller than a color range of the second color display standard.

A channel separating module 502, configured to perform channel separation on the second standard colors in the first color set, to acquire color components of the second standard colors respectively in a target color channel.

An adjusting module 503, configured to adjust the color components of the second standard colors respectively in the target color channel, to obtain a second color set.

A color card generation module 504, configured to generate a target color card in the second color display standard, according to the second color set, wherein, the target color card is used for implementing the target effect.

In some implementations, the color transferring module 501 is specifically configured to acquire optical signal data corresponding to the first standard colors; and transfer the optical signal data corresponding to the first standard colors, according to an opto-electrical transfer function of the second color display standard, to obtain the first color set.

In some implementations, the color transferring module 501 is further configured to acquire electrical signal data corresponding to the first standard colors; and transfer the electrical signal data corresponding to the first standard colors, according to an electro-optical transfer function of the first color display standard, to obtain the optical signal data corresponding to the first standard colors.

In some implementations, the adjusting module 503 is specifically configured to acquire color card configuration information, wherein, the color card configuration information is used to indicate an adjustment strategy corresponding to the color components corresponding to the target color channel; and adjust the color component values of the second standard colors in the target color channel, according to the color card configuration information, to obtain the second color set.

In some implementations, the color card configuration information includes: color components of the colors in the second color set in the target color channel, and/or, information of a function for adjusting the color components corresponding to the second standard colors in the target color channel.

In some implementations, the color card generation module 504 is specifically configured to acquire coordinate positions of the second standard colors in the standard color card to which they belong; acquire the coordinate positions of the colors in the second color set, according to a corresponding relationship between the second standard colors and the colors in the second color set, as well as the coordinate positions of the second standard colors in the standard color card to which they belong; and obtain the target color card, according to the colors in the second color set and the coordinate positions of the colors in the second color set.

In some implementations, the target color channel belongs to a target color space; and the target color space includes at least one of: an RGB color space, a YUV color space, and an HSV color space.

In some implementations, the first color display standard includes a standard dynamic range SDR color display standard; and the second color display standard includes a high dynamic range HDR color display standard.

The color card generation apparatus provided by the embodiments can be configured to execute the color card generation method according to any of the foregoing method embodiments, and has similar implementation principles and technical effects, for which the detailed description of the foregoing embodiments may be referred to; and for simplicity, no details will be repeated here.

Exemplarily, the present disclosure further provides an image processing apparatus.

Figure 6:
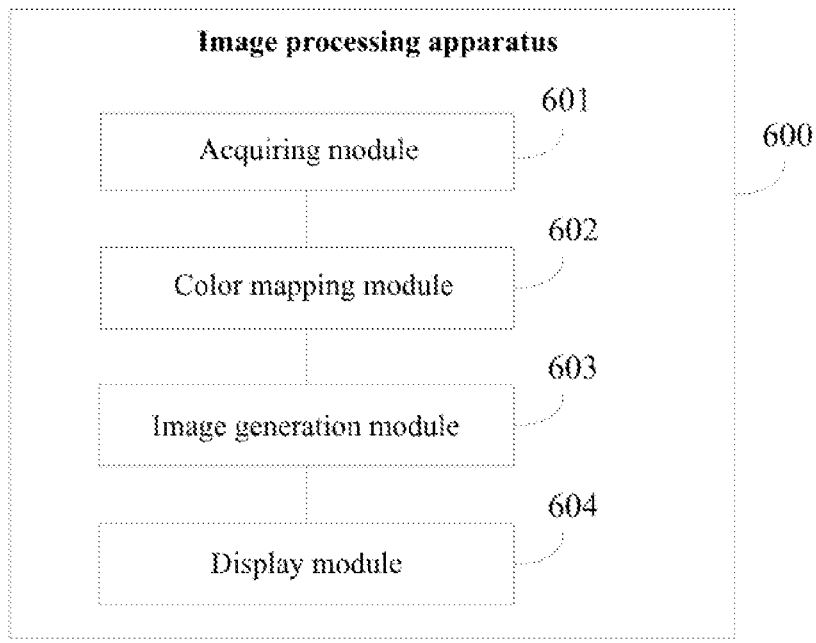
FIG. 6 is a structural schematic diagram of an image processing apparatus provided by embodiments of the present disclosure.

FIG. 6 is a structural schematic diagram of an image processing apparatus provided by embodiments of the present disclosure. Referring to FIG. 6, the image processing apparatus 600 provided by the embodiments includes:

An acquiring module 601, configured to acquire an image element to be processed and a target color card; wherein, the target color card is generated through the color card generation method shown by any of the foregoing method embodiments.

A color mapping module 602, configured to determine a target color corresponding to a pixel point, for each pixel point in the image element to be processed, according to an original color of the pixel point and the target color card; wherein, the original color corresponding to the pixel point and the target color both are colors in the second color display standard.

An image generation module 603, configured to acquire a target image element, according to a target color value of each pixel point.

In some implementations, the color mapping module 602 is specifically configured to acquire a coordinate position of the target color in the target color card, according to the original color and the coordinate position of the original color in the standard color card to which it belongs; and query the target color card, according to the coordinate position of the target color in the target color card, to obtain the target color.

In some implementations, the image processing apparatus 600 further includes: a display module 604, configured to transfer electrical signal data of the target colors corresponding to the pixel points in the target image element into optical signal data, according to an electro-optical transfer function corresponding to the second color display standard, to display the target image element.

The image processing apparatus provided by the embodiments can be configured to execute the image processing method according to any of the foregoing method embodiments, and has similar implementation principles and technical effects, for which the detailed description of the foregoing embodiments may be referred to; and for simplicity, no details will be repeated here.

Figure 7:
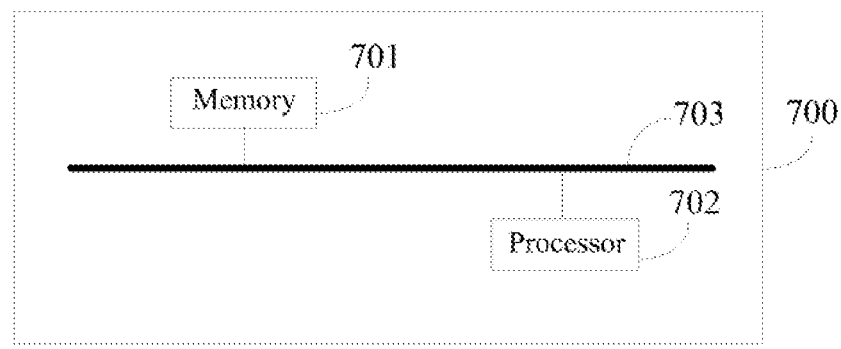
FIG. 7 is a structural schematic diagram of an electronic device provided by embodiments of the present disclosure.

FIG. 7 is a structural schematic diagram of an electronic device provided by an embodiment of the present disclosure. Referring to FIG. 7, the electronic device 700 provided by the embodiment includes: a memory 701 and a processor 702.

Wherein, the memory 701 may be an independent physical unit, and may be connected with the processor 702 through a bus 703. The memory 701 and the processor 702 may also be integrated together, and implemented through hardware, etc.

The memory 701 is configured to store program instructions; and the processor 702 implements the program instructions to execute any of the above-described method embodiments.

Optionally, when some or all of the methods according to the above-described embodiments are implemented through software, the above-described electronic device 700 may only include a processor 702. The memory 701 configured to store programs is located outside the electronic device 700, and the processor 702 is connected with the memory through circuits/electrical wires, and is configured to read and execute the programs stored in the memory.

The processor 702 may be a Central Processing Unit (CPU), a Network Processor (NP), or a combination of the CPU and the NP.

The processor 702 may further include a hardware chip. The above-described hardware chip may be an Application-Specific Integrated Circuit (ASIC), a Programmable Logic Device (PLD), or a combination of thereof. The above-described PLD may be a Complex Programmable Logic Device (CPLD), a Field-Programmable Gate Array (FPGA), a Generic Array Logic (GAL), or any combination thereof.

The memory 701 may include a volatile memory, for example, a Random-Access Memory (RAM); the memory may also include a non-volatile memory, for example, a flash memory, a Hard Disk Drive (HDD), or Solid-State Drive (SSD); and the memory may also include a combination of the above-described types of memory.

The present disclosure further provides a computer readable storage medium (which may also be referred to as a readable storage medium); the computer readable storage medium includes computer program instructions; and the computer program instructions, when executed by at least one processor of an electronic device, cause the electronic device to execute the color card generation method provided by any of the above-described method embodiments.

The present disclosure further provides a computer readable storage medium (which may also be referred to as a readable storage medium); the computer readable storage medium includes computer program instructions; and the computer program instructions, when executed by at least one processor of an electronic device, cause the electronic device to execute the image processing method provided by any of the above-described method embodiments.

The present disclosure further provides a computer program product; the computer program product includes computer program instructions stored in a readable storage medium; at least one processor of the electronic device may read the computer program instructions from the readable storage medium; and the at least one processor executes the computer program instructions to cause the electronic device to execute the color card generation method provided by any of the above-described method embodiments.

The present disclosure further provides a computer program product; the computer program product includes computer program instructions stored in a readable storage medium; at least one processor of the electronic device may read the computer program instructions from the readable storage medium; and the at least one processor executes the computer program instructions to cause the electronic device to execute the image processing method provided by any of the above-described method embodiments.

It should be noted that, herein, relational terms such as "first" and "second" are only used to distinguish one entity or operation from another entity or operation, and do not necessarily require or imply any actual relationship or order between these entities or operations. Moreover, the terms "including", "includes", or any other variation thereof are intended to encompass non-exclusive inclusion, such that a process, method, item, or device that includes a series of elements not only includes those elements, but also other elements that are not explicitly listed, or also include elements inherent in such a process, method, item, or device. Without further limitations, the elements limited by the statement "including one . . . " do not exclude the existence of other identical elements in the process, method, item, or equipment that includes the said elements.

The above are only specific implementations of this disclosure, which enable those skilled in the art to understand or implement this disclosure. The various modifications to these embodiments will be apparent to those skilled in the art, and the general principles defined herein can be implemented in other embodiments without departing from the spirit or scope of the present disclosure. Therefore, this disclosure will not be limited to the embodiments described herein, but rather to the widest scope consistent with the principles and novel features disclosed herein.

What is claimed is:

1. A color card generation method, performing by an electronic device, comprising the steps of:
    transferring first standard colors in a first color display standard into colors in a second color display standard, to obtain a first color set; wherein, the first color set comprises second standard colors in the second color display standard; and wherein, a color range of the first color display standard is smaller than a color range of the second color display standard;
    performing channel separation on the second standard colors in the first color set, to acquire color components of the second standard colors respectively in a target color channel;
    adjusting the color components of the second standard colors respectively in the target color channel, to obtain a second color set; and
    generating a target color card in the second color display standard, according to the second color set, wherein, the target color card is used for implementing a target effect.

2. The method according to claim 1, wherein, the transferring first standard colors in a first color display standard into colors in a second color display standard, to obtain a first color set, comprises:
    acquiring optical signal data corresponding to the first standard colors; and
    transferring the optical signal data corresponding to the first standard colors, according to an opto-electrical transfer function of the second color display standard, to obtain the first color set.

3. The method according to claim 2, wherein, before the acquiring optical signal data corresponding to the first standard values, the method further comprises:
    acquiring electrical signal data corresponding to the first standard colors; and
    transferring the electrical signal data corresponding to the first standard colors, according to an electro-optical transfer function of the first color display standard, to obtain the optical signal data corresponding to the first standard colors.

4. The method according to claim 1, wherein, the adjusting the color components of the second standard colors respectively in the target color channel, to obtain a second color set, comprises:
    acquiring color card configuration information, wherein the color card configuration information is used to indicate an adjustment strategy corresponding to the color components corresponding to the target color channel; and
    adjusting the color component values of the second standard colors in the target color channel, according to the color card configuration information, to obtain the second color set.

5. The method according to claim 4, wherein, the color card configuration information comprises: color components of the colors in the second color set in the target color channel, and/or, information of a function for adjusting the color components corresponding to the second standard colors in the target color channel.

6. The method according to any one of claim 1, wherein, the generating a target color card in the second color display standard, according to the second color set, comprises:
    acquiring coordinate positions of the second standard colors in a standard color card to which they belong;
    acquiring coordinate positions of the colors in the second color set, according to a corresponding relationship between the second standard colors and the colors in the second color set, as well as the coordinate positions of the second standard colors in the standard color card to which they belong; and
    obtaining the target color card, according to the colors in the second color set and the coordinate positions of the colors in the second color set.

7. The method according to any claim 1, wherein, the target color channel belongs to a target color space; and the target color space comprises at least one of: an RGB color space, a YUV color space, and an HSV color space.

8. The method according to claim 1, wherein, the first color display standard comprises a standard dynamic range SDR color display standard; and the second color display standard comprises a high dynamic range HDR color display standard.

9. An image processing method, comprising:
    acquiring an image element to be processed and a target color card; wherein, the target color card is generated through the color card generation method according to claim 1;
    determining a target color corresponding to a pixel point, for each pixel point in the image element to be processed, according to an original color of the pixel point and the target color card; wherein the original color corresponding to the pixel point and the target color both being colors in the second color display standard; and acquiring a target image element, according to a target color corresponding to each pixel point.

10. The method according to claim 9, wherein, the determining a target color of the pixel point in the second color display standard, according to the original color of the pixel point and the target color card, comprises:

acquiring a coordinate position of the target color in the target color card, according to the original color and a coordinate position of the original color in a standard color card to which it belongs; and querying the target color card, based on the coordinate position of the target color in the target color card, to obtain the target color.

11. The method according to claim 9, wherein, the method further comprises:

transferring electrical signal data of the target colors corresponding to the pixel points in the target image element into optical signal data, according to an electro-optical transfer function corresponding to the second color display standard, to display the target image element.

12. A color card generation apparatus, comprising:

a color transferring module, configured to transfer first standard colors in a first color display standard into colors in a second color display standard, to obtain a first color set;

wherein, the first color set comprises second standard colors in the second color display standard; and a color range of the first color display standard is smaller than a color range of the second color display standard;

a channel separating module, configured to perform channel separation on the second standard colors in the first color set, to acquire color components of the second standard colors respectively in a target color channel;

an adjusting module, configured to adjust the color components of the second standard colors respectively in the target color channel, to obtain a second color set; and a color card generation module, configured to generate a target color card in the second color display standard, according to the second color set, wherein, the target color card is used for implementing a target effect.

13. An image processing apparatus, comprising:

an acquiring module, configured to acquire an image element to be processed and a target color card; wherein, the target color card is generated through the color card generation method according to claim 1;

a color mapping module, configured to determine a target color corresponding to a pixel point, for each pixel point in the image element to be processed, according to an original color of the pixel point and the target color card; wherein, the original color of the pixel point and the target color both are colors in the second color display standard; and an image generation module, configured to acquire a target image element, according to a target color corresponding to each pixel point.

14. An electronic device, comprising: a memory and a processor; wherein, the memory is configured to store computer program instructions; and the processor is configured to execute the computer program instructions, to implement the color card generation method according to claim 1.

15. A readable storage medium, comprising: computer programs; wherein, the computer program, when executed by at least one processor of an electronic device, implements the color card generation method according to claim 1.

16. A computer program product, wherein, the computer program product, when running on a computer, causes the computer to implement the color card generation method according to claim 1.

17. An electronic device, comprising: a memory and a processor; wherein, the memory is configured to store computer program instructions; and the processor is configured to execute the computer program instructions, to implement the image processing method according to claim 9.

18. A readable storage medium, comprising: computer programs; wherein, the computer program, when executed by at least one processor of an electronic device, implements the image processing method according to claim 9.

19. A computer program product, wherein, the computer program product, when running on a computer, causes the computer to implement the image processing method according to claim 9.

20. The apparatus according to claim 12, wherein, the first color display standard comprises a standard dynamic range SDR color display standard; and the second color display standard comprises a high dynamic range HDR color display standard.

* * * * *